No. 688,080.  
Patented Dec. 3, 1901.
E. E. FLORA.
SCREEN HOLDER FOR PHOTOGRAPHIC CAMERAS.
(Application filed Sept. 26, 1898. Renewed May 4, 1901.)
(No Model.)
3 Sheets—Sheet 1.
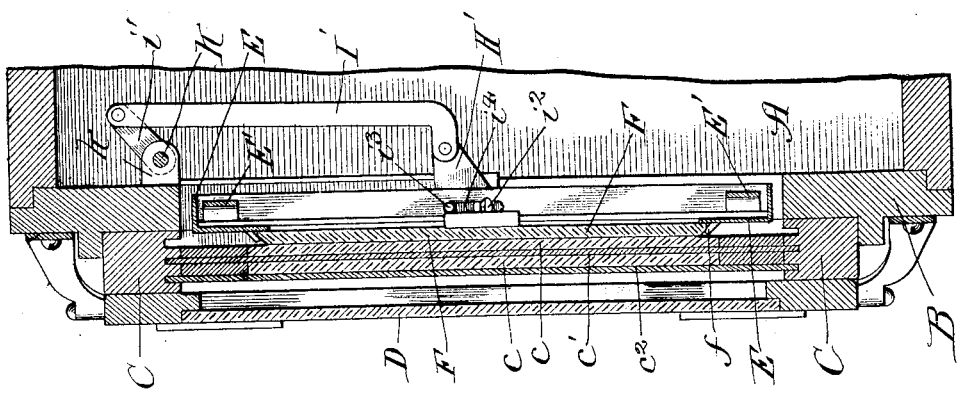
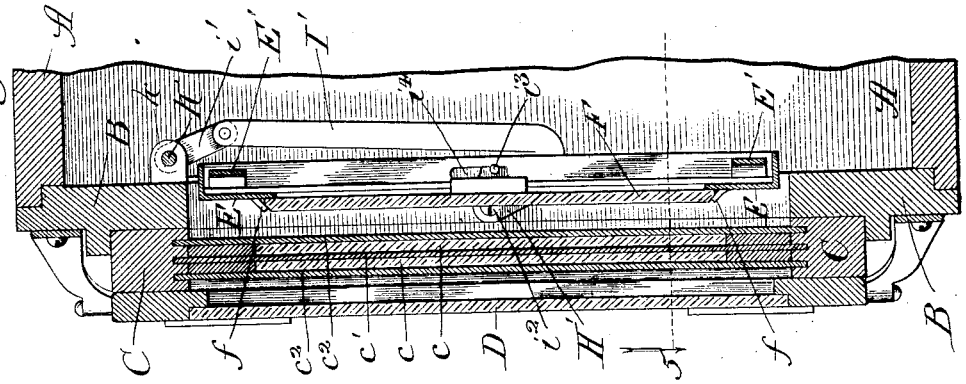
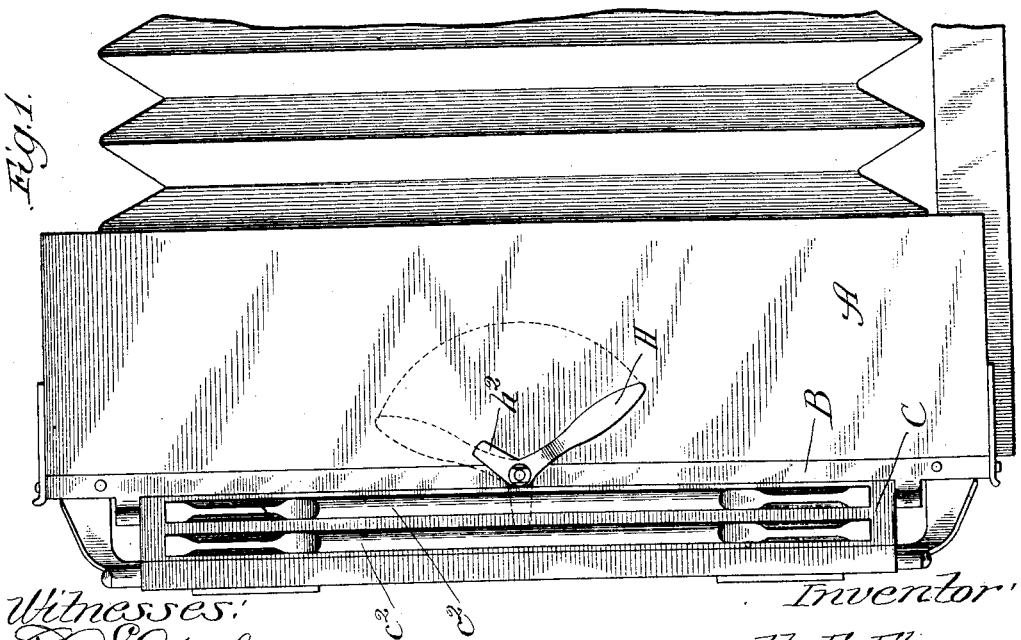
Witnesses:  
Chas. E. Gaylord,  
Luth. S. Ktt.
Inventor  
Ellsworth E. Flora.  
By Banning & Banning & Sheridan,  
Attys.

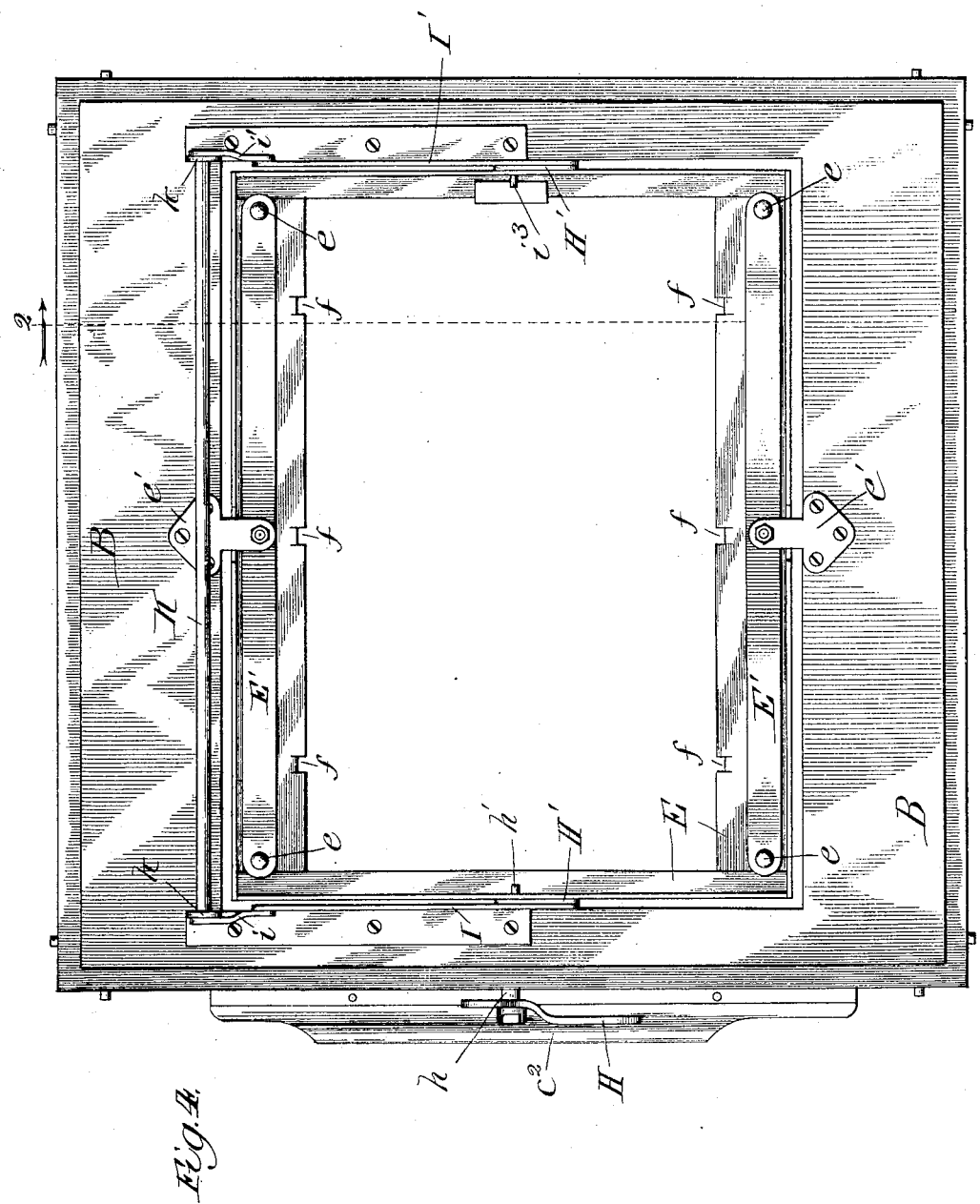

No. 688,080. Patented Dec. 3, 1901.
E. E. FLORA.
SCREEN HOLDER FOR PHOTOGRAPHIC CAMERAS.
(Application filed Sept. 26, 1898. Renewed May 4, 1901.)
(No Model.) 3 Sheets—Sheet 3.
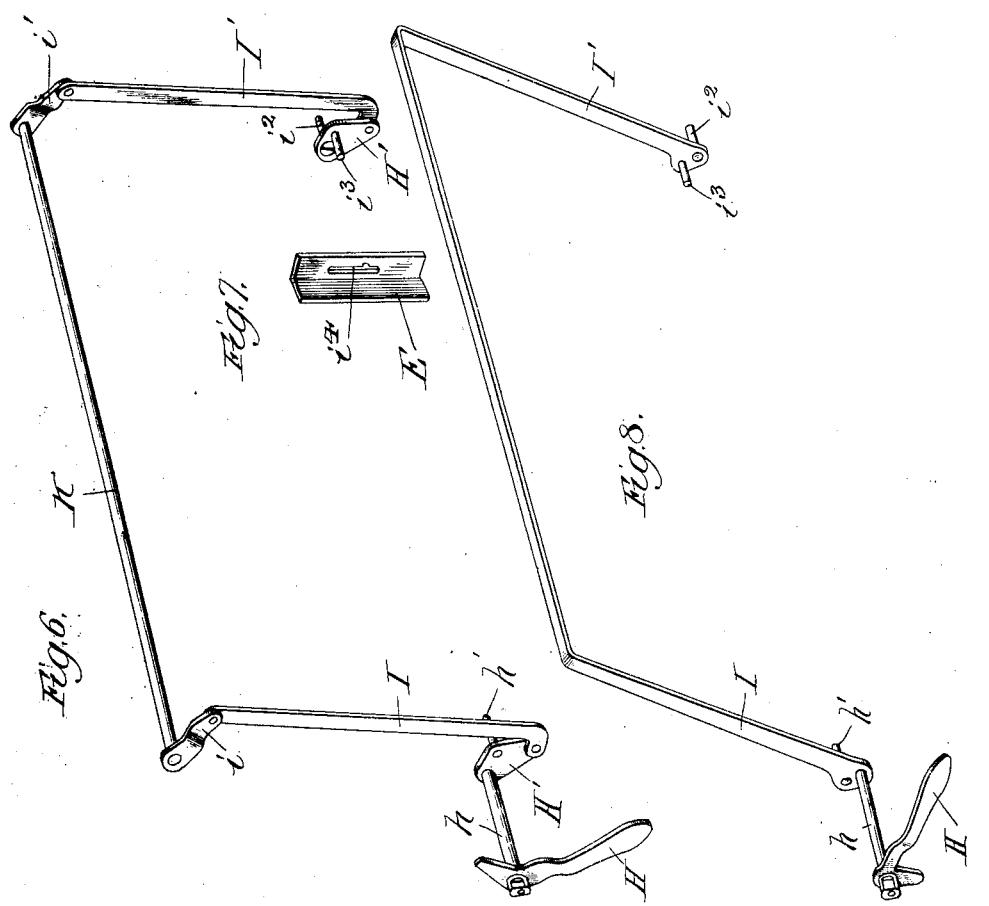
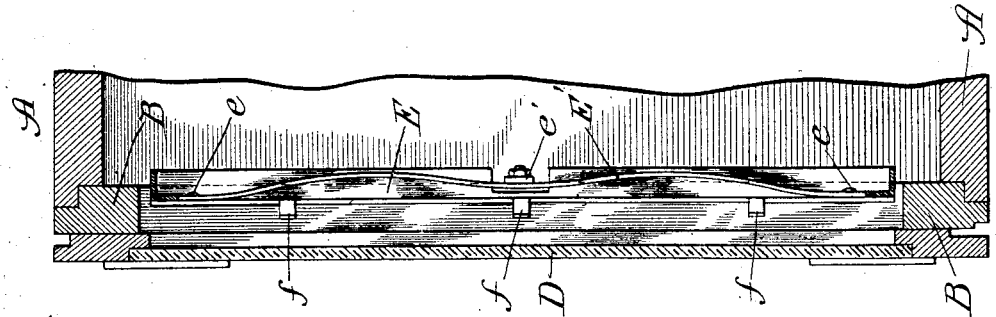
Witnesses: Inventor:
Ellsworth E. Flora,

UNITED STATES PATENT OFFICE.

ELLSWORTH E. FLORA, OF CHICAGO, ILLINOIS, ASSIGNOR TO DWIGHT K. TRIPP, OF CHICAGO, ILLINOIS.

SCREEN-HOLDER FOR PHOTOGRAPHIC CAMERAS.

SPECIFICATION forming part of Letters Patent No. 688,080, dated December 3, 1901.

Application filed September 26, 1898. Renewed May 4, 1901. Serial No. 58,810. (No model.)

*To all whom it may concern:*

Be it known that I, ELLSWORTH E. FLORA, a citizen of the United States, residing at Chicago, Illinois, have invented certain new and useful Improvements in Cameras, of which the following is a specification.

My invention has more special reference to the mechanism or devices for holding a screen in contact with a sensitized plate in a camera used in color photography; and my invention consists in the features and details of construction hereinafter described and claimed.

In the drawings, Figure 1 represents a side elevation of a portion of a camera; Fig. 2, a transverse sectional elevation taken in the line 2 of Fig. 4; Fig. 3, a similar view with the parts adjusted to different positions. Fig. 4 is a view in elevation of the back of the camera removed. Fig. 5 is a broken plan sectional view taken in line 5 of Fig. 2. Fig. 6 is a perspective view of the lever mechanism and parts for adjusting the screen. Fig. 7 is a perspective view of a detailed portion of the frame, and Fig. 8 is a perspective view of modified lever mechanism.

In making my improved mechanism for holding a screen in place against a sensitized plate in a camera I employ a camera A of any desired construction. This camera is provided with a back B, adapted to receive a dry-plate holder C of ordinary construction, in which sensitized plates $c$ and $c$ are placed, as is usual. These plates will be separated by a septum or partition $c'$ and provided with slides $c^2$ and $c^2$ in the usual way. A ground glass D may be employed for focusing, as usual; but I may say, in brief, that in all these various details the usual features of construction may be employed, if desired, and I need not stop to describe them with greater minuteness.

Coming now to the particular improvements constituting my invention, I arrange a rectangular frame E, fastened to the back in any suitable manner, so as to hold it in place. This frame is intended as a screen-holder. As shown in the drawings, I have fastened this frame to the back by means of leaf-springs E', which are attached to the frame by rivets $e$, as shown in Figs. 4 and 5, or in any other desired way, and I then attach the springs to the back by means of clips or lugs $e'$, as shown more particularly in Fig. 4. This causes the frame to hang in the back at a desired position and permits it to be moved as may be desired, so as to advance it toward the sensitized plate or draw it therefrom. In this frame is arranged a screen F, as shown particularly in Figs. 2 and 3. This screen may be held in the frame in any desired way, though, as shown in Figs. 2, 3, and 4, I have notched the frame at intervals and bent a portion $f$ out, so as to receive and hold the screen, as shown in Figs. 2 and 3. In order to move the frame with the screen toward or from the sensitive plate, I employ an arm H, mounted upon a shaft $h$, which is held in the back so that it may be turned by the arm. The inner end of the shaft is attached to a plate H', which is provided with a pin $h'$. An arm I is pivoted to the plate H' at one end, as shown in Fig. 6, and carries a link $i$ at the opposite end. This link carries a rod K, held in suitable bearings $k$, as shown in Fig. 4. At the other end of the rod K is another link $i'$ and another arm I', similarly pivoted to a plate H', properly mounted and fastened in the opposite end of the back by means of a screw $i^2$, as shown in Fig. 6. This plate is also provided with a pin $i^3$, which is intended to pass through a slot $i^4$ in the frame E. By turning the arm H in one direction or the other the frame E with the screen F will be advanced toward or from the sensitive plate. If now we withdraw the slide $c^2$ on that side of the sensitized plate next to the screen and turn the arm in the position shown by dotted lines in Fig. 1, the frame E and the screen F will be advanced until the screen rests against the sensitized surface of the sensitive plate $c$ left exposed by the withdrawal of the slide, so that they will occupy the positions shown in Fig. 3. The parts are now in position for an exposure of the object to be photographed, so that the rays of light will pass through the screen which rests against the sensitized surface of the plate before acting upon the sensitive material thereof. After the exposure has been made by reversing the movement of the arm H the frame E and screen F will be moved from the sensitized plate and thrown in the position shown in Fig. 2. Of course if it be desired to make a second exposure all that is necessary is to remove the dry-plate holder, turn it over so that its other sensitized plate will be on the side toward the screen, and repeat the operation already described. The arm H, as shown in Fig. 1, is provided with a tail or extension $h^2$. This tail or extension is in the position shown in Fig. 1 in full lines when the screen is moved away from the sensitized plate, as shown in Fig. 2; but after the slide has been withdrawn and the arm moved into the position shown in dotted lines in Fig. 1 and the screen brought close up against the sensitized surface of the dry plate the tail or extension is thrown across the opening from which the slide has been withdrawn, so that the slide cannot be inserted until the lever has been reversed and the screen moved away from the sensitive plate. This arrangement will prevent injury that otherwise might arise from attempting to insert the slide before removing the screen from its position of contact with the sensitized plate.

I may say in conclusion that while I have described the arrangement of the parts with considerable minuteness I do not desire to be limited thereto further than as the same may be specified in the claims; nor do I intend to confine myself to the use of my invention in connection with any particular kind of camera, as it is adapted for use with different kinds. It may be used in those which contain dry plates, as illustrated in the drawings, or with those which employ a film as well, the arrangements, of course, being such as to advance the screen against the film when in its position for an exposure, in which case it is a plain surface, the same as an ordinary dry plate.

What I regard as new, and desire to secure by Letters Patent, is—

1. In a camera, the combination of a plate-holder, a movable screen-holder, and a flexible support for the screen-holder permitting movements thereof toward and from the plate-holder, substantially as described.

2. In a camera, the combination of a plate-holder, a movable screen-holder, a flexible support for the screen-holder permitting movements thereof toward and from the plate-holder, and a lever mechanism operable from the outside of the camera for moving the screen-holder on its flexible support, substantially as described.

3. In a camera, the combination of a plate-holder, a screen-holder, springs for holding the screen-holder in a desired position with reference to the plate-holder, and means for moving the screen-holder toward and from the plate-holder, substantially as described.

4. In a camera, the combination of a plate-holder, a screen-holder, means for moving the screen-holder toward and from the plate-holder, and means for preventing the insertion of a slide while the screen-holder is in its position toward the plate-holder, substantially as described.

5. In a camera, the combination of a plate-holder, a movable screen-holder, a flexible support for the screen-holder permitting movements thereof toward and from the plate-holder, a swinging carrier for the screen-holder and an outside arm or lever for moving the swinging carrier, substantially as described.

ELLSWORTH E. FLORA.

Witnesses:
D. K. TRIPP,
THOMAS B. MCGREGOR.